(12) United States Patent
Nakao et al.

(10) Patent No.: US 10,265,640 B2
(45) Date of Patent: Apr. 23, 2019

(54) METHOD OF ADJUSTING DUTY OF HEAT EXCHANGE IN HEAT INTEGRATED DISTILLATION COLUMN

(71) Applicant: TOYO ENGINEERING CORPORATION, Tokyo (JP)

(72) Inventors: Takato Nakao, Narashino (JP); Toshihiro Wakabayashi, Narashino (JP); Kouichi Tachikawa, Narashino (JP)

(73) Assignee: Toyo Engineering Corporation, Tokyo (JP)

( * ) Notice: Subject to any disclaimer, the term of this patent is extended or adjusted under 35 U.S.C. 154(b) by 129 days.

(21) Appl. No.: 15/415,114

(22) Filed: Jan. 25, 2017

(65) Prior Publication Data

US 2017/0209806 A1    Jul. 27, 2017

(30) Foreign Application Priority Data

Jan. 26, 2016    (JP) .................. 2016-012224

(51) Int. Cl.
*B01D 3/14*    (2006.01)
*B01D 3/42*    (2006.01)
(Continued)

(52) U.S. Cl.
CPC .......... *B01D 3/4211* (2013.01); *B01D 1/2856* (2013.01); *B01D 1/2896* (2013.01);
(Continued)

(58) Field of Classification Search
CPC .. B01D 1/2856; B01D 1/2896; B01D 3/4211; B01D 3/007; B01D 3/143; B01D 3/42;
(Continued)

(56) References Cited

U.S. PATENT DOCUMENTS 3,225,551 A    12/1965 Kelley
4,615,769 A *  10/1986 Horigome ................ C07C 7/04
                                                  202/182
(Continued)

FOREIGN PATENT DOCUMENTS

EP    2875850 A1    5/2015
EP    2896442 A1    7/2015
(Continued)

OTHER PUBLICATIONS

Extended European Search Report issued Jun. 7, 2017 in corresponding EP Application No. 17151832.7.

*Primary Examiner* — Jonathan Miller
(74) *Attorney, Agent, or Firm* — Knobbe, Martens, Olson & Bear, LLP (57) ABSTRACT

The duty of internal heat exchange can be flexibly adjusted without impairing energy saving performance of a HIDiC. A method of adjusting the duty of heat exchange in a heat exchange structure of a HIDiC includes totally condensing a portion of the vapor fed to a heat exchange structure in a heat exchange structure; and providing a liquid control valve downstream of the heat exchange structure on the first line, without providing a control valve on a vapor-flowing part of first and second lines of the HIDiC, and adjusting a flow rate of a portion of the compressor outlet vapor flowing into the heat exchange structure by using the control valve, while compensating for a pressure loss needed for the control valve by using a liquid head of a condensate, and/or by using pressurization by a pump.

2 Claims, 8 Drawing Sheets

(51) Int. Cl.
  *B01D 5/00* (2006.01)
  *B01D 3/00* (2006.01)
  *B01D 1/28* (2006.01)

(52) U.S. Cl.
  CPC ............ *B01D 3/007* (2013.01); *B01D 3/143* (2013.01); *B01D 3/42* (2013.01); *B01D 5/0051* (2013.01); *B01D 5/0054* (2013.01); *B01D 5/0075* (2013.01)

(58) Field of Classification Search
  CPC ... B01D 5/0051; B01D 5/0054; B01D 5/0075
  See application file for complete search history.

(56) References Cited

U.S. PATENT DOCUMENTS

| | | | |
|---|---|---|---|
| 4,767,527 A | 8/1988 | Iniotakis et al. | |
| 4,961,826 A * | 10/1990 | Grethlein | B01D 1/2856 202/154 |
| 5,252,187 A * | 10/1993 | Ohtsu | B01D 1/26 159/24.2 |
| 8,182,654 B2 * | 5/2012 | Sechrist | B01D 3/007 203/26 |
| 8,440,056 B2 * | 5/2013 | Nakaiwa | B01D 3/143 202/154 |
| 9,266,034 B2 * | 2/2016 | Wakabayashi | B01D 3/007 |
| 9,278,295 B2 * | 3/2016 | Wakabayashi | B01D 3/007 |
| 9,573,866 B2 * | 2/2017 | Io | B01D 3/14 |
| 9,908,060 B2 * | 3/2018 | Wakabayashi | B01D 1/28 |
| 2012/0085126 A1 * | 4/2012 | Gupta | B01D 1/28 62/617 |
| 2012/0125761 A1 * | 5/2012 | Nakaiwa | B01D 3/143 202/154 |
| 2013/0256115 A1 * | 10/2013 | Wakabayashi | B01D 1/28 202/154 |

FOREIGN PATENT DOCUMENTS

| | | |
|---|---|---|
| JP | H08-066601 A | 3/1996 |
| JP | 2004-016928 | 1/2004 |
| JP | 2013-208561 A | 10/2013 |
| WO | 2011/043199 A1 | 4/2010 |

* cited by examiner

METHOD OF ADJUSTING DUTY OF HEAT EXCHANGE IN HEAT INTEGRATED DISTILLATION COLUMN

This application is based upon and claims the benefit of priority from Japanese patent application No. 2016-012224, filed on Jan. 26, 2016, the disclosure of which is incorporated herein in its entirety by reference.

BACKGROUND OF THE INVENTION

Field of the Invention

The present invention relates to a method of adjusting the duty of internal heat exchange in a heat integrated distillation column (hereinafter sometimes referred to as "HIDiC").

Description of the Related Art

While separation operation by distillation has been widely used in general industrial processes, it is a unit operation that consumes an exceedingly large amount of energy. Therefore, distillation apparatuses capable of reducing their energy consumption have been studied in industry. Through such study, a HIDiC has been developed as a distillation apparatus that is excellent in energy saving performance (WO2011/043199, JP08-66601A and JP2004-16928A).

In a usual distillation column, the temperature of the stripping section (section below a feedstock feed stage) is higher than the temperature of the rectifying section (section above the feedstock feed stage). According to the basic concept of the HIDiC, the temperature of the rectifying section is made higher than the temperature of the stripping section by using compression of gas by a compressor, and heat is transferred from the rectifying section to the stripping section through heat exchange (called "internal heat exchange"). In this way, heat input at the reboiler and heat removal at the condenser can be reduced (the internal heat exchange substitutes at least part of the heat input and the heat removal), and as a result, a distillation apparatus having extremely high energy efficiency can be obtained.

JP2013-208561A (in particular, FIGS. 7 and 8) discloses that the internal heat exchange is performed by passing a compressor outlet vapor through a heat exchanger which is provided at a stage that is very close to the column bottom of a lower pressure column, and thereby, heat is transferred from the compressor outlet vapor to this stage of the lower pressure column.

SUMMARY OF THE INVENTION

The method of using the compressor outlet vapor as a heat source of the internal heat exchange is advantageous in that the transfer of fluid, which is necessary for the internal heat exchange, can be efficiently performed with a simple apparatus configuration. The method of internal heat exchange shown in FIGS. 7 and 8 of JP2013-208561A has this advantage.

Figure 2:
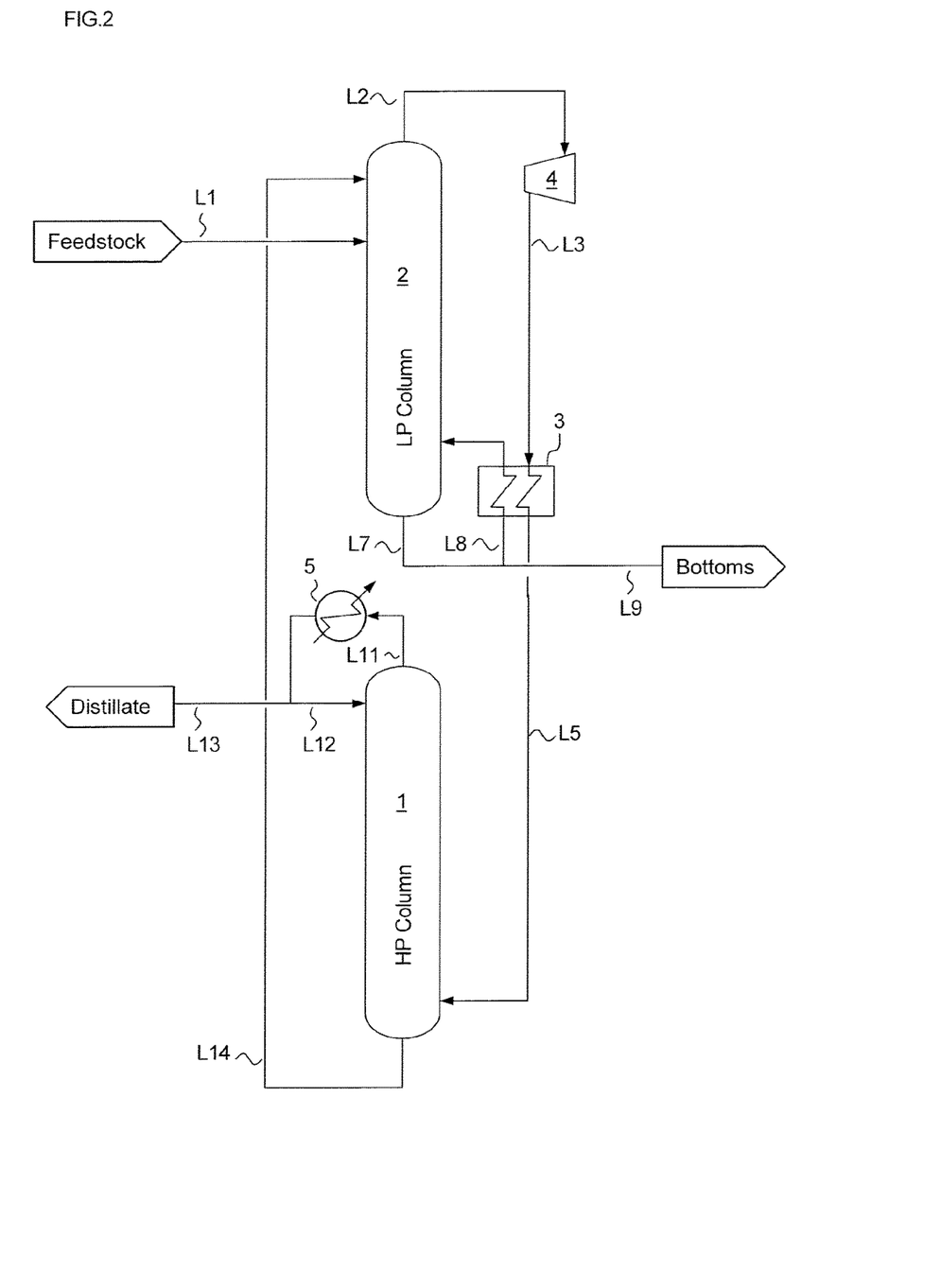
FIG. 2 is a conceptual diagram showing a configuration of a HIDiC which the inventors studied.

The inventors have studied such a method of internal heat exchange as mentioned above, and the method will be described here with reference to FIG. 2. The HIDiC shown in this figure has higher pressure column 1 and lower pressure column 2. Note that, in the drawings, "HP" and "LP" stand for "higher pressure" and "lower pressure", respectively. Feedstock is fed to an intermediate stage (a part other than the column bottom) of the lower pressure column through line L1. Heat exchange structure 3 which functions as a reboiler is provided at the column bottom of the lower pressure column.

An overhead vapor (line L2) of the lower pressure column is fed to compressor 4, and is pressurized, and simultaneously, increased in temperature. A compressor outlet vapor (line L3) is sent to heat exchange structure 3 and used as a heat source of the reboiler in heat exchange structure 3. Thus, heat is transferred from the compressor outlet vapor (line L3) to the column bottom of the lower pressure column. Thereby, the internal heat exchange is established. The fluid having been used for the heat source of the reboiler is sent from heat exchange structure 3 to the column bottom of the higher pressure column through line L5.

It is sometimes desirable to adjust the duty of heat exchange in internal heat exchange during the operation of the HIDiC. In the method of internal heat exchange as mentioned above, however, it is impossible to flexibly adjust the duty of heat exchange (the duty of heat exchange in heat exchange structure 3).

Figure 3:
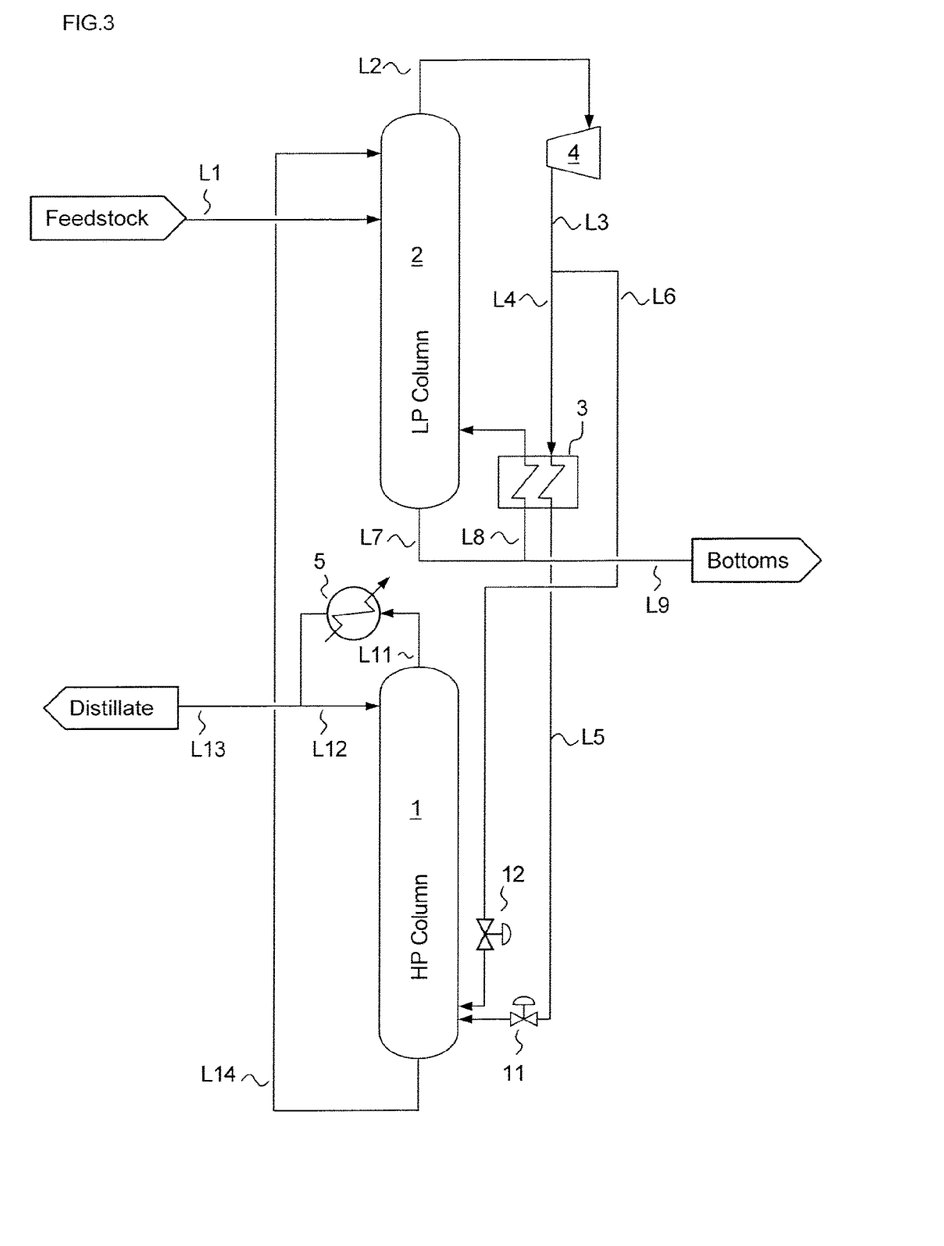
FIG. 3 is a conceptual diagram showing another configuration of the HIDiC which the inventors studied.

The inventors have studied a HIDiC shown in FIG. 3 in connection with a method capable of flexibly adjusting the duty of internal heat exchange. This HIDiC has lines which are divided from compressor outlet line L3, that is, a line (lines L4 and L5) which passes through heat exchange structure 3 to reach the column bottom section of the higher pressure column, and a bypass line L6 which bypasses heat exchange structure 3. The HIDiC has control valves 11 and 12 on lines L5 and L6, respectively.

In general, when one line (L3) branches to provide a bypass line (L6) and the flow distribution between both lines is adjusted, control valves (11 and 12) are provided on the original line (L4 and L5) and on the bypass line (L6). A control valve is a device which imposes a pressure loss on a fluid that is flowing through the control valve. The control valve has a characteristic that allows fluid to pass therethrough, when the valve opening position is adjusted, at a rate that depends on the valve opening position and on the difference between pressures that are upstream and downstream of the control valve. Due to this characteristic of the control valve, a pressure loss which is sufficient for the system to maintain flexibility and stability of operation is generally applied by way of the control valve. If a valve is provided on only one of the two lines, it will be difficult to obtain a sufficient pressure loss on the control valve. Therefore, control valves are generally installed on both lines. By installing the control valves on both lines, a sufficient pressure loss can be assured for both of these lines, which allows a pressure balance in the system to be established at any flow distribution and enables a flexible flow distribution to be realized.

In the case of the process shown in FIG. 3, by using control valves 11 and 12, it is possible to adjust the flow rate of a portion flowing into heat exchange structure 3 out of the compressor outlet vapor (in other words, the flow rate of fluid passing through lines L4 and L5) and the flow rate of a portion (L6) that bypasses the heat exchange structure out of the compressor outlet vapor. The flow rate of the portion flowing into heat exchange structure 3 out of the compressor outlet vapor affects the duty of internal heat exchange in heat exchange structure 3, and by increasing or decreasing the flow rate of this fluid by using the control valves, the duty of internal heat exchange in heat exchange structure 3 can be flexibly adjusted.

In this case, the vapor which has been pressurized by the compressor is depressurized by the control valves, and thereafter introduced into higher pressure column 1. The operation pressure of higher pressure column 1 is set depending on the following: the temperature difference needed for realizing internal heat exchange to be implemented (for example, internal heat exchange, if any, that is different from the embodiment shown as internal heat exchange structure 3 that uses the compressor outlet vapor for internal heat exchange); the temperature of a cooling medium that can be used for a part that needs heat removal; restrictions in relation to the pressure for withdrawing overhead gas; or the like. Meanwhile, the discharge pressure of the compressor is set so as to satisfy the following conditions: the discharge pressure should be equal to or higher than a pressure that enables the compressed vapor to be fed to higher pressure column 1 which is being operated at the pressure that is set according to the aforementioned approach; and at the same time, the discharge pressure should be equal to or higher than a pressure that enables, as a result of the temperature increase which is caused by the pressurization, heat to be transferred from the compressor outlet vapor to the lower pressure column. This means that the discharge pressure of the compressor is determined such that, amongst these two conditions, one condition that requires a higher pressure is satisfied. However, the discharge pressure of the compressor is often determined so that the former condition is satisfied, i.e. so that the compressed vapor can be fed to higher pressure column 1. In this case, the pressure loss generated at the control valve must be compensated by pressurization using the compressor.

Accordingly, in such a case as above, when bypass line L6 and control valves 11 and 12 are provided in order to make the duty of heat exchange in heat exchange structure 3 adjustable, power that is required for the compressor must be increased to compensate for the pressure losses at the control valves, which impairs the energy saving performance of the HIDiC.

An object of the present invention is to provide a method of adjusting the duty of internal heat exchange in which the method enables the flexible adjustment of the duty of internal heat exchange while the energy saving performance of a HIDiC is kept high.

According to an aspect of the present invention, there is provided a method of adjusting a duty of heat exchange in a heat integrated distillation column, wherein the heat integrated distillation column includes:

a higher pressure column configured to perform vapor-liquid contact at a relatively higher pressure;

a lower pressure column configured to perform vapor-liquid contact at a relatively low pressure;

a compressor configured to pressurize an overhead vapor of the lower pressure column;

a first line for directing a portion of a compressor outlet vapor from the compressor to a column bottom of the higher pressure column via a heat exchange structure, the heat exchange structure being configured to transfer heat from said portion of the compressor outlet vapor to the lower pressure column;

a second line for directing the rest of the compressor outlet vapor from the compressor to the column bottom of the higher pressure column, the second line bypassing the heat exchange structure; and a third line for directing a column bottom liquid of the higher pressure column to a column top of the lower pressure column, wherein the method is for adjusting a duty of heat exchange in said heat exchange structure, and wherein the method includes:

i) totally condensing said portion of the compressor outlet vapor fed to the heat exchange structure in the heat exchange structure; and ii) providing a liquid control valve downstream of the heat exchange structure on the first line, without providing a control valve on a vapor-flowing part of the first and second lines, and adjusting a flow rate of said portion of the compressor outlet vapor flowing into the heat exchange structure by using the liquid control valve, while compensating for a pressure loss needed for the liquid control valve by using a liquid head of a condensate obtained through said condensing, and/or by using pressurization of the condensate by a pump.

The method may include buffering fluctuation of a liquid level of the liquid condensed in the heat exchange structure, or preventing vapor from passing through the liquid control valve, by using a condensate pot.

According to the present invention, there is provided a method of adjusting the duty of internal heat exchange in which the method enables the flexible adjustment of the duty of internal heat exchange while the energy saving performance of a HIDiC is kept high.

DETAILED DESCRIPTION OF THE EXEMPLARY EMBODIMENTS

Embodiments of the present invention are hereafter described with reference to the drawings, but the present invention is not limited thereto. The present invention is hereafter described with comparison to an apparatus shown in FIG. 3 as appropriate. It should be noted that the apparatus shown in FIG. 3 is an apparatus that the inventors have studied for reference, and that the apparatus shown in FIG. 3 is not publicly known, as far as the inventors are aware. The term "liquid head" means a potential head of liquid.

[Basic Configuration of Distillation Apparatus (HIDiC)]

A distillation apparatus that can be preferably used to implement the present invention includes the following elements (see FIG. 1): higher pressure column 1; lower pressure column 2; compressor 4; a first line (lines L3, L4 and L5); a second line (lines L3 and L6); and third line L14. The overhead vapor of the lower pressure column is introduced via line L2 into compressor 4.

Figure 1:
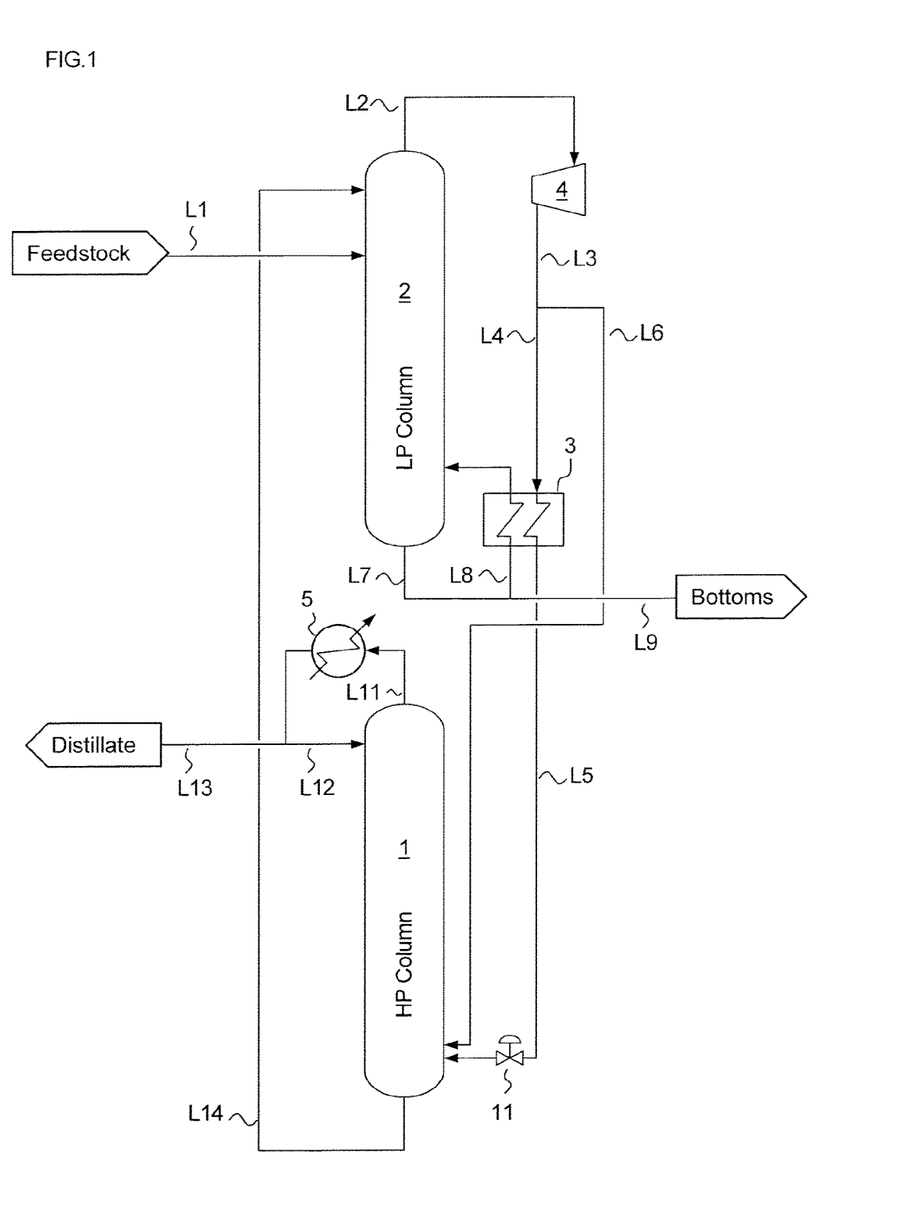
FIG. 1 is a conceptual diagram illustrating a configuration of a HIDiC that may be preferably used to implement a method of the present invention.

The distillation apparatus shown in FIG. 1 constitutes a HIDiC. The present invention relates to a method of adjusting the duty of heat exchange in heat exchange structure 3 in such a distillation apparatus. The method includes the following steps:

i) Totally condensing a portion of a compressor outlet vapor which is fed to heat exchange structure 3 in heat exchange structure 3.

ii) Providing liquid control valve 11 downstream of heat exchange structure 3 on the first line, but not providing a control valve on a vapor-flowing part of the first and second lines, and adjusting the flow rate of the portion of the compressor outlet vapor flowing into heat exchange structure 3 (flow rate in line L4) by using liquid control valve 11, while compensating for a pressure loss needed for liquid control valve 11 by using a liquid head of a condensate obtained through the condensing (total condensation in heat exchange structure 3), or by using pressurization of the condensate by a pump, or by using both of this liquid head and the pressurization of the condensate by the pump.

[Higher Pressure Column, Lower Pressure Column and Compressor]

While vapor-liquid contact is performed in each of higher pressure column 1 and lower pressure column 2, the vapor-liquid contact is performed in higher pressure column 1 at a relatively higher pressure than in lower pressure column 2. The overhead vapor of the lower pressure column is pressurized by the compressor, and thereafter, is eventually fed to a column bottom of the higher pressure column. Accordingly, with compressor 4, the higher pressure column can have a higher pressure than the lower pressure column.

The pressurization at the compressor is performed to such an extent that a compressed vapor can be fed to higher pressure column 1 which is operated at a predetermined pressure or performed to an even higher degree than this, and also to such an extent that an increase in temperature resulting from the pressurization enables heat to be transferred from the compressor outlet vapor to the lower pressure column or performed to an even higher degree than this. The operation pressure of higher pressure column 1 is determined based on the following: the temperature difference needed for realizing internal heat exchange to be implemented (for example, internal heat exchange, if any, that is different from the embodiment shown as internal heat exchange structure 3 that uses the compressor outlet vapor for internal heat exchange); the temperature of a cooling medium that can be used for a part that needs heat removal; restrictions in relation to the pressure for withdrawing overhead gas; or the like.

Similarly to a conventional distillation column (distillation column composed of a single column), trays or packing may be disposed within the higher pressure column and the lower pressure column each to promote vapor-liquid contact.

[First and Second Lines and Heat Exchange Structure]

The first line directs a portion of the compressor outlet vapor to the column bottom of higher pressure column 1 from the compressor via heat exchange structure 3 (lines L3, L4 and L5). The second line directs the rest of the compressor outlet vapor to the column bottom of the higher pressure column from the compressor, bypassing heat exchange structure 3 (lines L3 and L6). In FIG. 1, line L3 is shared by the first line and the second line. Furthermore, the first line and the second line share the column bottom of higher pressure column 1 as their end points. Namely, the pressures at the start points of both lines are the same, and the pressures at the end points thereof are also approximately the same. It should be noted that, when either or both of the first line and the second line are connected to a level lower than the liquid level in the column bottom of higher pressure column 1, the pressures at the end points of both lines are different from each other by an amount of pressure which is caused by the liquid head of the column bottom liquid of the higher pressure column. The distribution of the flow rates of vapors flowing into the first line and the second line is determined by pressure balances which satisfy pressure conditions at the start points and the end points of both lines. In FIG. 1, the connecting position of line L6 to the higher pressure column is at a level higher than the connecting position of line L5 to the higher pressure column. However, any one of these connecting positions may be higher than the other, provided that both lines are connected to the bottom section of the higher pressure column. Alternatively, the connection positions of these lines to the higher pressure column may be at the same level.

Heat exchange structure 3 transfers heat from the portion of the compressor outlet vapor (portion fed to heat exchange structure 3 through line L4) to the lower pressure column through indirect heat exchange. FIG. 1 shows that the destination of the heat transfer is a reboiler stage of the lower pressure column. But other options may be possible, and the heat may be transferred to any stage in the lower pressure column.

[Third Line and Others]

Third line L14 directs the column bottom liquid of the higher pressure column to the column top of the lower pressure column. This liquid transfer may be realized by the pressure difference between the higher pressure column and the lower pressure column. However when the liquid transfer cannot be realized only by this pressure difference, a pump may be used as appropriate.

The HIDiC may be equipped with condenser 5. Overhead gas of higher pressure column 1 is fed to the overhead condenser through line L11 to be cooled, and at least a part thereof is condensed. A part of the fluid thus obtained is refluxed to the higher pressure column through line L12, and the rest thereof is discharged as a distillate of the HIDiC through L13. As a cooling medium in the overhead condenser, appropriate fluid can be selected from among applicable cooling media depending on operation conditions.

In addition, not shown in FIG. 1, the HIDiC may be equipped with, as necessary, a reboiler which is heated with an appropriate external heating medium in the lower pressure column.

[Method of Adjusting Duty of Heat Exchange]

The portion of the compressor outlet vapor fed to the heat exchange structure 3 through line L4 is totally condensed in heat exchange structure 3. To this end, the heat exchange structure may be designed such that the heat exchange structure can have sufficient heat exchange capacity so as to achieve the maximum duty of heat exchange estimated for the condensation operation.

As the result of the total condensation, the fluid flowing in line L5 from the outlet of heat exchange structure 3 to the column bottom of the higher pressure column is liquid. Liquid control valve 11 is installed on liquid line L5, and a flow rate of the liquid flowing in line L5, that is, the rate of vapor condensation in heat exchange structure 3 is adjusted using this control valve 11. Thereby, the duty of heat exchange in heat exchange structure 3 can be adjusted.

As mentioned above, in general, pressure loss which is sufficient for the system to maintain flexibility and stability of operation must be applied, by way of the control valve, to the fluid passing through the control valve. According to the present invention, control valve 11 realizes flexible control of operation, without imposing an excessive pressure loss on the vapor passing through bypass line L6 by a control valve or the like.

To realize this, pressure loss that is needed for liquid control valve 11 is compensated by using a liquid head of a condensate accumulated inside liquid line L5 or accumulated inside liquid line L5 and heat exchange structure 3, or compensated by pressurization using a pump installed on liquid line L5. Thereby, the pressure balances of both the first and second lines can be simultaneously satisfied at an intended flow distribution. Both the liquid head and the pressurization with a pump may be used. In this way, sufficient pressure loss needed for flexible control of control valve 11 can be obtained.

In order to utilize the liquid head, heat exchange structure 3 is disposed at a position that is higher than the connection port of line L5 to higher pressure column 1 and higher than the liquid level of the column bottom liquid in higher pressure column 1.

In the case of using a pump, the pump can be provided on line L5 between the condensate outlet of heat exchange structure 3 and the higher pressure column. Pressurization of liquid with a pump consumes a much smaller amount of power than pressurization of gas with a compressor.

Assuming that a potential head of gas is negligibly small, in order to compensate for the pressure loss that is needed for liquid control valve 11 to simultaneously satisfy the pressure balances of both the first and second lines, a pressure increase, which is equal to the pressure difference calculated by subtracting "a pressure difference between the start and end points of the second line" from "a pressure loss generated in the first line", can be brought about by the liquid head, the pressurization with a pump, or by both the liquid head and pressurization with the pump. It should be noted that, when either or both of the first and second lines are connected to higher pressure column 1 at a level lower than the liquid level of the column bottom thereof, the needed pressure increase will vary by the amount of pressure which is caused by the liquid head of the column bottom liquid of the higher pressure column, and therefore, this variation should be taken into account.

Figure 4:
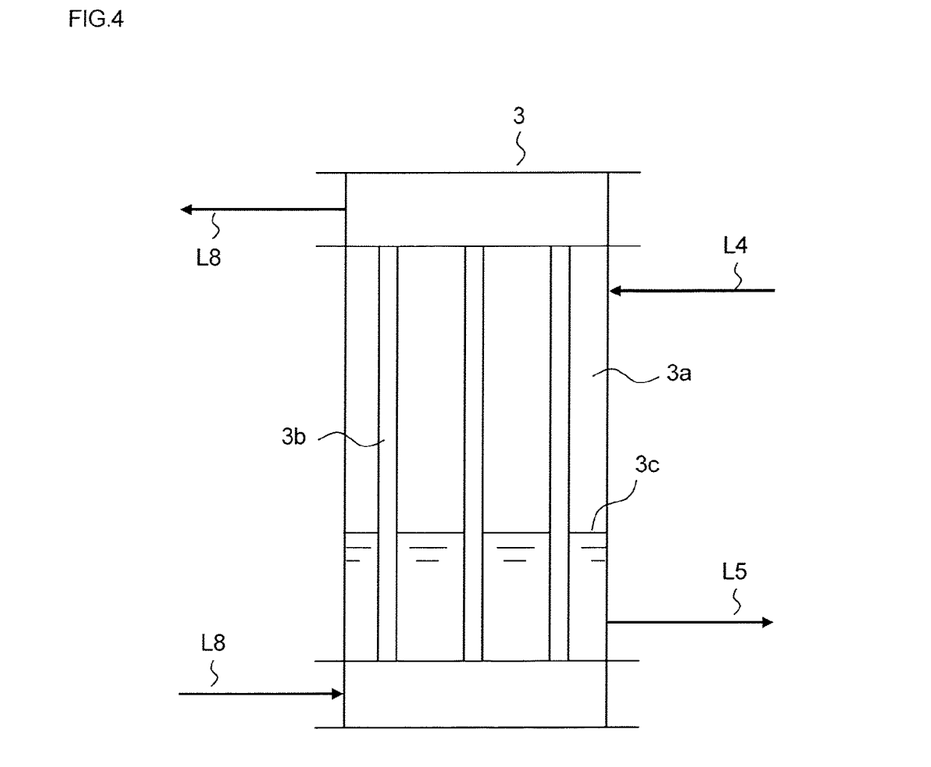
FIG. 4 is a schematic diagram illustrating a detailed example of a heat exchange structure.

Here, using FIG. 4, there will be described a phenomenon which occurs in the heat exchange structure in the case where the flow rate of the liquid flowing in line L5 is changed. The description will be herein made using, as an example of heat exchange structure 3, a shell and tube heat exchanger in which the portion of the compressor outlet vapor flows onto shell side 3a and the fluid from the lower pressure column flows on tube side 3b (in the tubes). This portion of the compressor outlet vapor is fed to the upper section of the shell through line L4, is cooled and totally condensed by the column bottom liquid of the lower pressure column flowing in the tubes, and is discharged to line L5 from the lower section of the shell. The heat transfer area which effectively works for condensing vapor on the shell side corresponds to the surface area of a part of the tubes that is not immersed in the liquid on the shell side (that is, the part above liquid level 3c). The ratio between "the surface area of a part of the tubes that is immersed in the liquid" and "the surface area of a part of the tubes that is not immersed in the liquid" on the shell side affects the total duty of heat exchange realized in the heat exchange structure. As the liquid level is at a lower position in the shell, that is, the heat transfer area which effectively works for condensation is larger, the total duty of heat exchange in heat exchange structure 3 tends to increase. This results from the characteristic that the heat transfer efficiency (rate of heat exchange per unit area) of the heat transfer surface which effectively works for condensing the vapor on the shell side is larger than the heat transfer efficiency of the heat transfer surface of the part in which the shell side is immersed in the condensate.

First, description will be made on the case where the flow rate of the liquid flowing in line L5 is increased by increasing the valve opening position of liquid control valve 11 from a certain steady state (initial steady state). In this case, the discharge rate of liquid from the shell side increases, and accordingly, the liquid level in the shell descends. Then, the heat transfer area that works effectively for condensation increases. Therefore, the duty of heat exchange in heat exchange structure 3 increases. When the duty of heat exchange increases, more vapor is condensed. Accordingly, the rate of liquid that is to be discharged from the shell to line L5 increases. As a result, transition to another steady state in which line L5 has a larger flow rate than the initial steady state can be achieved. On the other hand, when the valve opening position of liquid control valve 11 is decreased, a phenomenon opposite to the above occurs.

In other words, the flow rate of liquid in line L5 is adjusted by liquid control valve 11, and as a result, the position of the liquid level in the heat exchange structure is adjusted (a liquid level is present in the heat exchange structure since the liquid is totally condensed in the heat exchange structure). Heat exchange capacity according to the position of the liquid level is generated in the heat exchange structure, and as a result, the condensation rate of the vapor on the shell side and the duty of internal heat exchange are adjusted. The flow distribution between the flow rate of the flow in the first line (flow rate in L4) and the flow rate of the flow in the second line (flow rate in L6) out of the compressor outlet vapor is indirectly determined by the condensation rate in heat exchange structure 3.

In other words, in the apparatus shown in FIG. 3 for comparison, the flow rates of fluids flowing in the first and second lines can be adjusted as follows. Here, it is assumed that the total flow rate of the fluids flowing in the first line and the second line (bypass line) is determined by another factor.

(1) An appropriate pressure loss is imposed on the fluid flowing in the bypass line (second line) by control valve 12 that is installed on the bypass line. In other words, a pressure loss is provided on the bypass line to such an extent that pressure balances of both the first and second lines are simultaneously satisfied at an intended flow distribution.

(2) As the result of the above item (1), the flow rate in the first line can be adjusted by control valve 11 that is installed on the first line, and accordingly, the duty of heat exchange in heat exchange structure 3 can be adjusted.

(3) As the result of the above item (2), the flow rate in the bypass line is indirectly determined.

In contrast, according to the present invention, even when the above item (1) is eliminated (i.e. not using control valve 12), the duty of heat exchange in heat exchange structure 3 can be adjusted as in the above item (2), and the above item (3) can also be realized. That is to say, in the present invention, as a method for realizing a flexible flow distribution using control valve 11, the pressure balances of the first and second lines are simultaneously satisfied not by imposing a pressure loss on the second line by way of a control valve or the like, but instead by using the liquid head inside the first line or the like.

As described above, without providing a control valve on the second line, flexible operation control is realized by control valve 11 by using the liquid head of the condensate that is accumulated inside liquid line L5 or accumulated inside liquid line L5 and heat exchange structure 3, or by pressurization with a pump installed on liquid line L5, or by the similar way. Thereby, the duty of heat exchange in heat exchange structure 3, in other words, the duty of internal heat exchange in the HIDiC can be adjusted.

As mentioned above, a gas control valve is not provided on the lines which direct the compressor outlet vapor to the column bottom of the higher pressure column, that is, on the first and second lines. In other words, there is not any control valve installed on the vapor-flowing part (i.e. part in which vapor flows) of the first and second lines. Accordingly, no control valve is provided on lines L3, L4 and L6, that is, on a part between compressor 4 and heat exchanger structure 3 of the first line, and on the entire second line. A control valve is not needed on the second line (L3 and L6). It should be noted that a valve which is not originally intended to adjust operation, such as a shut-off valve, may be installed on the vapor-flowing part of the first and second lines, since such a valve generates almost no pressure loss in normal operation.

In this way, according to the present invention, the duty of internal heat exchange can be adjusted by only using a liquid control valve, and not using a gas control valve, while using a bypass line. Accordingly, it is not necessary to compensate for a pressure loss generated at a control valve by pressurization with a compressor, and thus energy saving performance of the HIDiC is not impaired in this regard.

[Condensate Pot]

As described above referring to FIG. 4, transition from a certain steady state to another steady state can be achieved. However, there may be a possibility that the condensate in the heat exchange structure is temporarily depleted or that the condensate temporarily spills over from the heat exchange structure, for example, in the case where the valve opening position of liquid control valve 11 is very rapidly changed. When such a phenomenon may occur, the volume of the condensate may be increased by using a condensate pot, and as a result, fluctuation of the liquid level in the heat exchange structure may be buffered to prevent such a phenomenon as mentioned above. In other words, the fluctuation speed and the fluctuation amplitude of the liquid level of liquid condensed in the heat exchange structure can be reduced.

Using FIGS. 5 and 6, there will be described an example of an embodiment in which a condensate pot is used. Compressor outlet line L3 is divided into lines L4 and L6, and further, L4 is divided into lines L21 and L22. Line L21 is connected to condensate pot 6, and line L22 is connected to heat exchange structure 3. Liquid condensed in heat exchange structure 3 is fed to condensate pot 6 through line L23.

Figure 6:
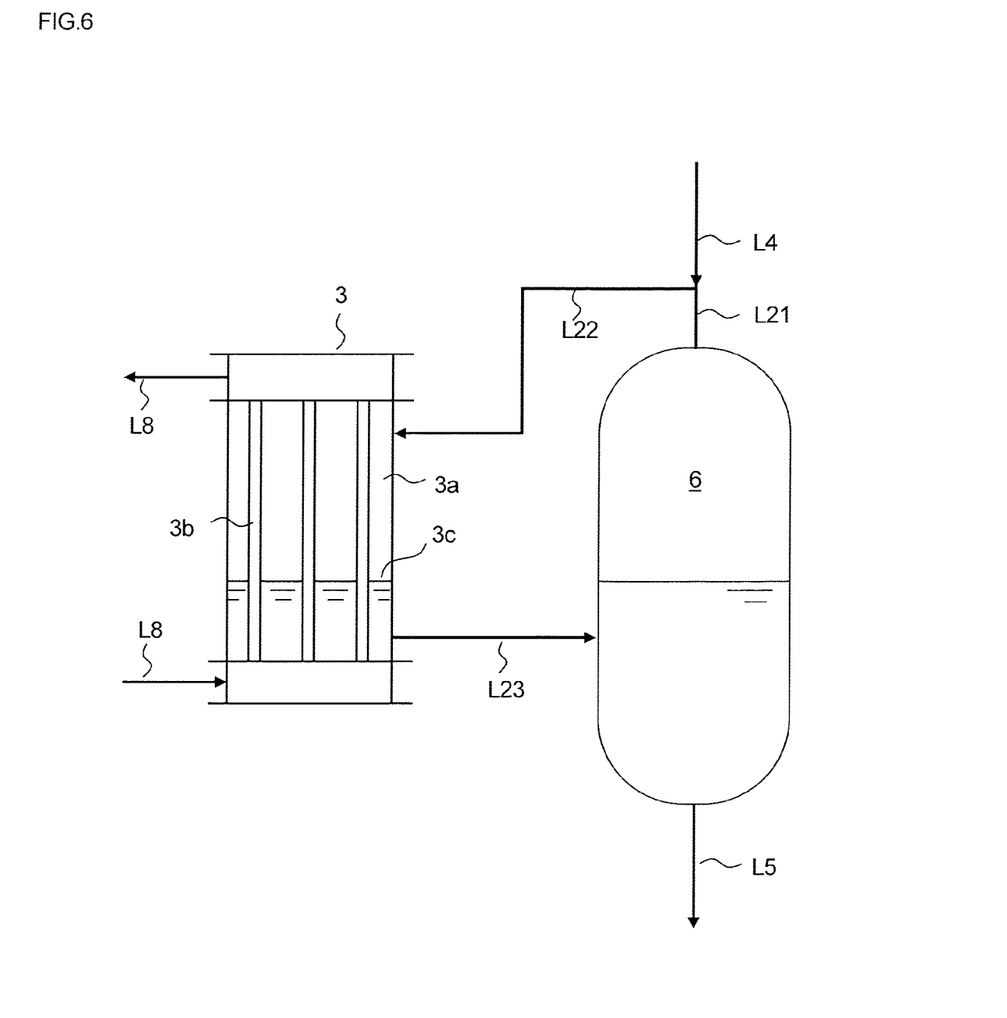
FIG. 6 is a conceptual diagram for explaining an example of a condensate pot.

In the embodiment shown in FIG. 6, condensate pot 6 is provided so as to include the entire region where liquid level $3c$ in heat exchange structure 3 can exist in the vertical direction. For example, condensate pot 6 can be provided so as to include the entire region where the shell of heat exchange structure 3 exists in the vertical direction. One side of the heat exchange structure (shell side in FIG. 6) communicates with condensate pot 6 through lines L21, L22 and L23. Accordingly, the liquid levels at the identical height are formed on this side of the heat exchange structure (shell side in FIG. 6) and in the condensate pot.

As mentioned above, it can be said that the liquid level of the condensate that is generated inside the heat exchange structure and the liquid level in the condensate pot move in unison with each other, and thereby, an increase or decrease of the amount of the condensate or an increase or decrease of the amount of the discharged condensate corresponds to the sum total of "an increase or decrease amount of the liquid volume inside the heat exchange structure due to the fluctuation of the liquid level" and "an increase or decrease in the amount of the liquid volume inside the condensate pot due to the fluctuation of the liquid level". Accordingly, the capacity of the condensate pot can be used for increasing or decreasing the amount of the condensate or increasing or decreasing the amount of the discharged condensate, and thereby, the fluctuation speed of the liquid level can be reduced and the phenomenon, as described above, can be prevented.

It is also possible to prevent such a situation in which depletion of the condensate causes vapor to pass through the liquid control valve by providing the condensate pot at a position lower than the heat exchange structure or lower than the liquid level inside the heat exchange structure. When vapor or fluid mixture of vapor and liquid passes through the liquid control valve, it may be difficult to properly adjust the flow rate of the vapor flowing into the heat exchange structure. In the case of providing a condensate pot for such a purpose, although the condensate pot does not affect the fluctuation rate of the liquid level inside the heat exchange structure, the condensate pot can be made smaller than the aforementioned condensate pot. In addition, as a means to prevent such a situation in which vapor passes through the liquid control valve, this kind of condensate pot can be employed, in the case where it is not desired that the fluctuation speed of the liquid level be made smaller. When the condensate pot is provided at a position lower than the heat exchange structure or than the liquid level inside the heat exchange structure, a liquid level, which corresponds to liquid level $3c$ generated inside the heat exchange structure, will be generated inside line L21 of FIG. 6.

Figure 5:
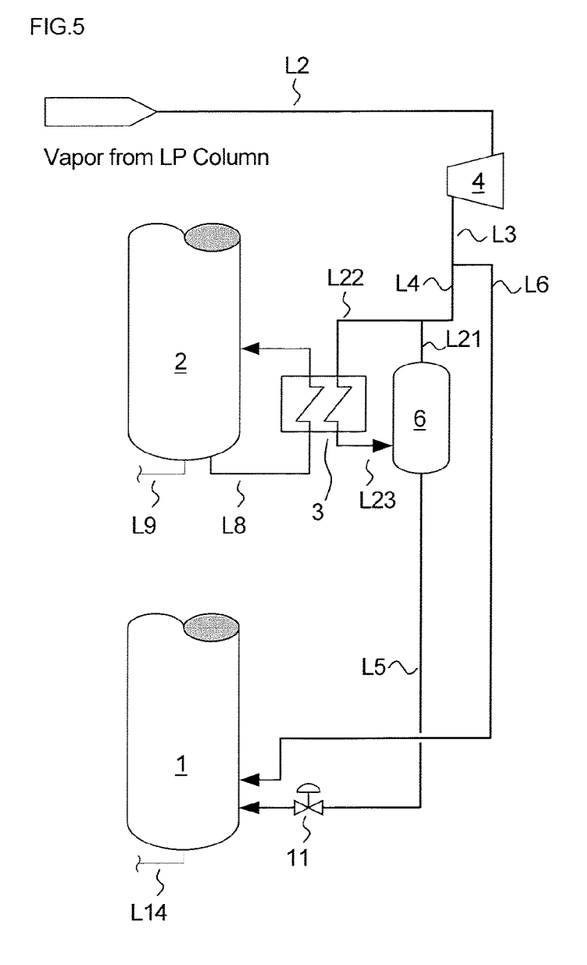
FIG. 5 is a conceptual partial diagram for explaining a configuration of another HIDiC that may be preferably used to implement the method of the present invention.

It should be noted that, in FIG. 5, a part of the HIDiC is omitted and not shown. In addition, line L8 which sends the column bottom liquid to the reboiler and line L9 which discharges the column bottom liquid as bottoms are separately withdrawn from the column bottom of the lower pressure column (line L7 in FIG. 1 does not exist in FIG. 5).

[Details of Heat Exchange Structure]

In the embodiment shown in FIG. 1, as heat exchange structure 3, a heat exchanger provided outside the lower pressure column (and outside the higher pressure column) is used. The column bottom liquid of the lower pressure column is withdrawn into line L7. A portion of the liquid is fed to the heat exchanger through line L8 to be heated, preferably partially or entirely vaporized, and returned to the lower pressure column. The rest of the column bottom liquid of the lower pressure column is discharged as bottoms through line L9. In other words, FIG. 1 shows an example in which heat exchange structure 3 functions as a reboiler of the HIDiC.

As such a heat exchange structure, a publicly known heat exchanger, such as a shell and tube heat exchanger and a plate fin heat exchanger, can be used as appropriate. While the compressor outlet vapor flows on the shell side in FIG. 4, the compressor outlet vapor may flow on the tube side.

Figure 7:
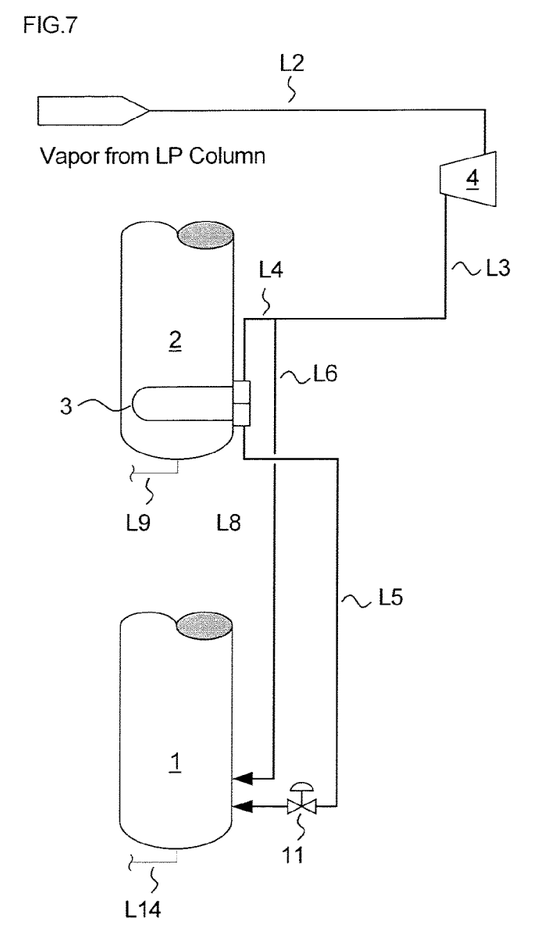
FIG. 7 is a conceptual partial diagram for explaining a configuration of still another HIDiC preferable for implementing the method of the present invention.

Alternatively, as shown in FIG. 7, a tube bundle heat exchanger which employs U-tubes may be inserted into the interior of the column bottom section of the lower pressure column to constitute heat exchange structure 3. In the tube bundle heat exchanger, the U-tubes are horizontally provided. One end of each U-shaped tube, which is disposed at a higher position, is connected to line L4, and the other end, which is disposed at a lower position, is connected to line L5. A portion of the compressor outlet vapor flows into the tube bundle heat exchanger through line L4, is totally condensed, and is discharged through line L5.

[Position where Heat from Compressor Outlet Vapor is Received]

Figure 8:
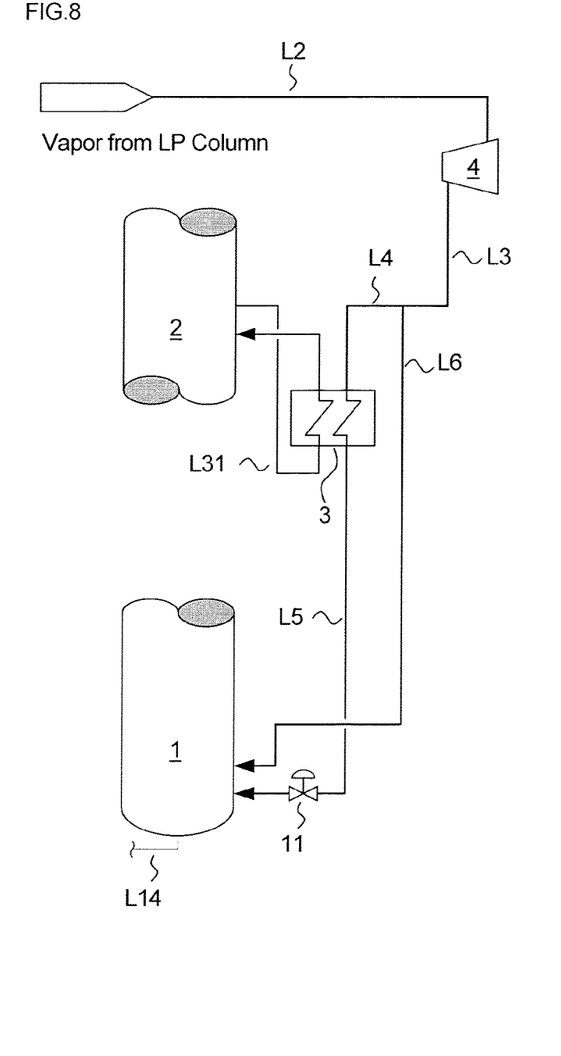
FIG. 8 is a conceptual partial diagram for explaining a configuration of still another HIDiC preferable for implementing the method of the present invention.

In the embodiments shown in FIGS. 1, 5 and 7, heat is transferred from the portion of the compressor outlet vapor in line L4 to the column bottom section of lower pressure column 2. However, other options may be possible, and heat may be transferred from the portion of the compressor outlet vapor in line L4 to an intermediate stage of the lower pressure column as shown in FIG. 8. The position where the heat from the portion of the compressor outlet vapor is received may be any stage of the lower pressure column. It should be noted that, as apparent from the embodiment shown in FIG. 1, regarding the present invention, the term "lower pressure column" is understood to include the reboiler stage.

In the HIDiC in the embodiment shown in FIG. 8, fluid is withdrawn from the intermediate stage of the lower pressure column. The withdrawn fluid is heated in the heat exchanger (heat exchange structure 3) that is provided outside the lower pressure column and outside the higher pressure column, and returned to the lower pressure column. In more detail, liquid can be withdrawn from an intermediate stage of the lower pressure column, heated in heat exchange structure 3, and preferably partially or entirely vaporized, and returned to the stage immediately below the aforementioned intermediate stage. Alternatively, the tube bundle heat exchanger as shown in FIG. 7 may be inserted into an intermediate stage of the lower pressure column.

[Other Heat Exchange Structures]

In the present invention, the HIDiC has a heat exchange structure that transfers heat from a portion of the compressor outlet vapor to the lower pressure column. In addition to this heat exchange structure, the HIDiC may include another heat exchange structure(s) which is known in the art as a configuration of the HIDiC, for example, an internal heat exchange structure which uses fluid contained in higher pressure column 1, instead of the compressor outlet vapor, as a heat source.

EXAMPLES

Example 1

A heat and mass balance was calculated for a HIDiC having the configuration shown in FIG. 1 except for the following:
  The heat exchange structure was installed in accordance with the embodiment shown in FIG. 8. That is, fluid was withdrawn from an intermediate stage of the lower pressure column, heated in the heat exchanger (heat exchange structure 3) which was provided outside the lower pressure column and outside the higher pressure column, and returned to the lower pressure column.
  The lower pressure column was equipped with a reboiler (not shown) heated with an external heating medium at the column bottom section. Heat exchange structure 3 which served as a reboiler as shown in FIG. 1 was not present.

In Example 1, the discharge pressure of the compressor was set at such a level that compressed vapor could be fed to higher pressure column 1.

Table 1 shows conditions of the feedstock which was fed to lower pressure column 2 through line L1. It should be noted that "C8" means that "the carbon number is 8", and "C10+ compound" means compounds that have a carbon number of not less than 10. The pressure is indicated in absolute pressure (the same holds true for the other tables).

Specifications required for the product were set as described in Table 2.

TABLE 1

| Feedstock Conditions | | |
|---|---|---|
| Temperature | [° C.] | 142 |
| Pressure | [kPa] | 600 |
| Flow Rate | [t/h] | 50 |
| Composition | | |
| C8 Aromatic Compounds | [mass %] | 95.9 |
| C9 Aromatic Compounds | [mass %] | 4.0 |
| C10+ Compounds | [mass %] | 0.1 |

TABLE 2

| Product Specifications | |
|---|---|
| Composition of Column Top Product (Distillate) | C9 Aromatic Compounds 0.75 mass % |
| Composition of Column Bottom Product (Bottoms) | C8 Aromatic Compounds 1.59 mass % |

Comparative Example 1

A heat and mass balance was calculated for a usual distillation column that was not a HIDiC, in other words, a distillation column composed of a single column equipped with an overhead condenser and a reboiler, with the feedstock conditions and the product specifications being the same as those in Example 1.

Comparative Example 2

A heat and mass balance was calculated for a HIDiC having the configuration shown in FIG. 3 except the following:
  The heat exchange structure was installed in accordance with the embodiment shown in FIG. 8. That is, fluid was withdrawn from an intermediate stage of the lower pressure column, heated in the heat exchanger (heat exchange structure 3) which was provided outside the lower pressure column and outside the higher pressure column, and returned to the lower pressure column.
  The lower pressure column was equipped with a reboiler (not shown) heated with an external heating medium at the column bottom section. Heat exchange structure 3 which serves as a reboiler as shown in FIG. 1 was not present.

In this example, 50 kPa was counted as a pressure loss caused by gas control valve 12 on vapor bypass line L6. Accordingly, the discharge pressure of compressor 4 in Comparative Example 2 was set to be higher by 50 kPa than the discharge pressure in Example 1. In this way, the heat and mass balance in Comparative Example 2 was calculated in the same configuration under the same conditions as those in Example 1 except that gas control valve 12 was installed on bypass line L6 and that the discharge pressure of the compressor was set to be higher by 50 kPa. Therefore, the difference in compressor power, which was derived from the difference in discharge pressure of the compressor, had a direct influence on the difference between indices of energy saving performance in Example 1 and in Comparative Example 1.

Table 3 shows the duty of condenser 5 applied by an external cooling medium, duty of the reboiler (not shown) applied by an external heating medium, power of compressor 4, a converted value obtained by converting the compressor power into primary energy, and an index of energy saving performance. Assuming that the power generation efficiency is 36.6%, the converted value into primary energy was obtained from the formula "(compressor power)/0.366". The index of energy saving performance was calculated from the following equation. The larger the index of energy saving performance, the more superior the energy saving performance.

(index of energy saving performance [%])=[1−{(reboiler duty applied by the external heating medium in the HIDiC)+(converted value of compressor power into primary energy)}/(reboiler duty applied by the external heating medium in a usual distillation operation)]×100 where the term "reboiler duty applied by the external heating medium in a usual distillation operation" means the reboiler duty in Comparative Example 1.

TABLE 3

Results of Energy Calculation

| | | Comparative Example 1 | Comparative Example 2 | Example 1 |
|---|---|---|---|---|
| Condenser Duty | [MW] | 7.63 | 0.32 | 0.19 |
| Reboiler Duty | [MW] | 7.64 | 1.07 | 1.07 |
| Compressor Power | [kW] | — | 934 | 790 |
| Converted Value of Compressor Power into Primary Energy | [MW] | — | 2.55 | 2.16 |
| Index of Energy Saving Performance | [%] | — | 52.6 | 57.7 |

Table 4 shows details of conditions for calculating compressor power.

TABLE 4

Details concerning Estimation of Required Power for Compressor

| | | Comparative Example 2 | Example 1 |
|---|---|---|---|
| Suction Pressure | [kPa] | 235 | 235 |
| Discharge Pressure | [kPa] | 475 | 425 |
| Flow Rate of Fluid to be Compressed | [kNm3/h] | 21.2 | 21.2 |
| Composition of Fluid to be Compressed | | | |
| C8 Aromatic Compounds | [mass %] | 98.7 | 98.7 |
| C9 Aromatic Compounds | [mass %] | 1.3 | 1.3 |
| Adiabatic Efficiency | [%] | 70 | 70 |
| Required Power | [kW] | 934 | 790 |

In Comparative Example 2, the power required for the compressor is larger than in Example 1, which is caused by the pressure loss at gas control valve 12. Accordingly, the energy saving performance in Example 1 is more excellent than the energy saving performance in Comparative Example 2.

EXPLANATION OF LETTERS OR NUMERALS

1 Higher pressure column (higher pressure section)
2 Lower pressure column (lower pressure section)
3 Heat exchange structure
4 Compressor
5 Overhead condenser
6 Condensate pot
11, 12 Control valves

What is claimed is:

1. A method of adjusting a duty of heat exchange in a heat integrated distillation column,
   wherein the heat integrated distillation column comprises:
      a higher pressure column configured to perform vapor-liquid contact at a relatively higher pressure;
      a lower pressure column configured to perform vapor-liquid contact at a relatively lower pressure;
      a compressor configured to pressurize an overhead vapor of the lower pressure column;
      a first line for directing a portion of a compressor outlet vapor from the compressor to a column bottom of the higher pressure column via a heat exchange structure, the heat exchange structure being configured to transfer heat from said portion of the compressor outlet vapor to the lower pressure column;
      a second line for directing the rest of the compressor outlet vapor from the compressor to the column bottom of the higher pressure column, the second line bypassing the heat exchange structure; and
      a third line for directing a column bottom liquid of the higher pressure column to a column top of the lower pressure column,
   wherein the method is for adjusting a duty of heat exchange in said heat exchange structure, and
   wherein the method comprises:
   i) totally condensing said portion of the compressor outlet vapor fed to the heat exchange structure in the heat exchange structure; and
   ii) providing a liquid control valve downstream of the heat exchange structure on the first line, without providing a control valve on a vapor-flowing part of the first and second lines, and adjusting a flow rate of said portion of the compressor outlet vapor flowing into the heat exchange structure by using the liquid control valve, while compensating for a pressure loss needed for the liquid control valve by using a liquid head of a condensate obtained through said condensing, and/or by using pressurization of the condensate by a pump.

2. The method according to claim 1, further comprising buffering fluctuation of a liquid level of the liquid condensed in the heat exchange structure, or preventing vapor from passing through the liquid control valve, by using a condensate pot.

* * * * *